Nov. 7, 1950     C. T. G. LOONEY     2,528,963
DRIVE FOR NUTATORS
Filed Jan. 5, 1946     3 Sheets-Sheet 1
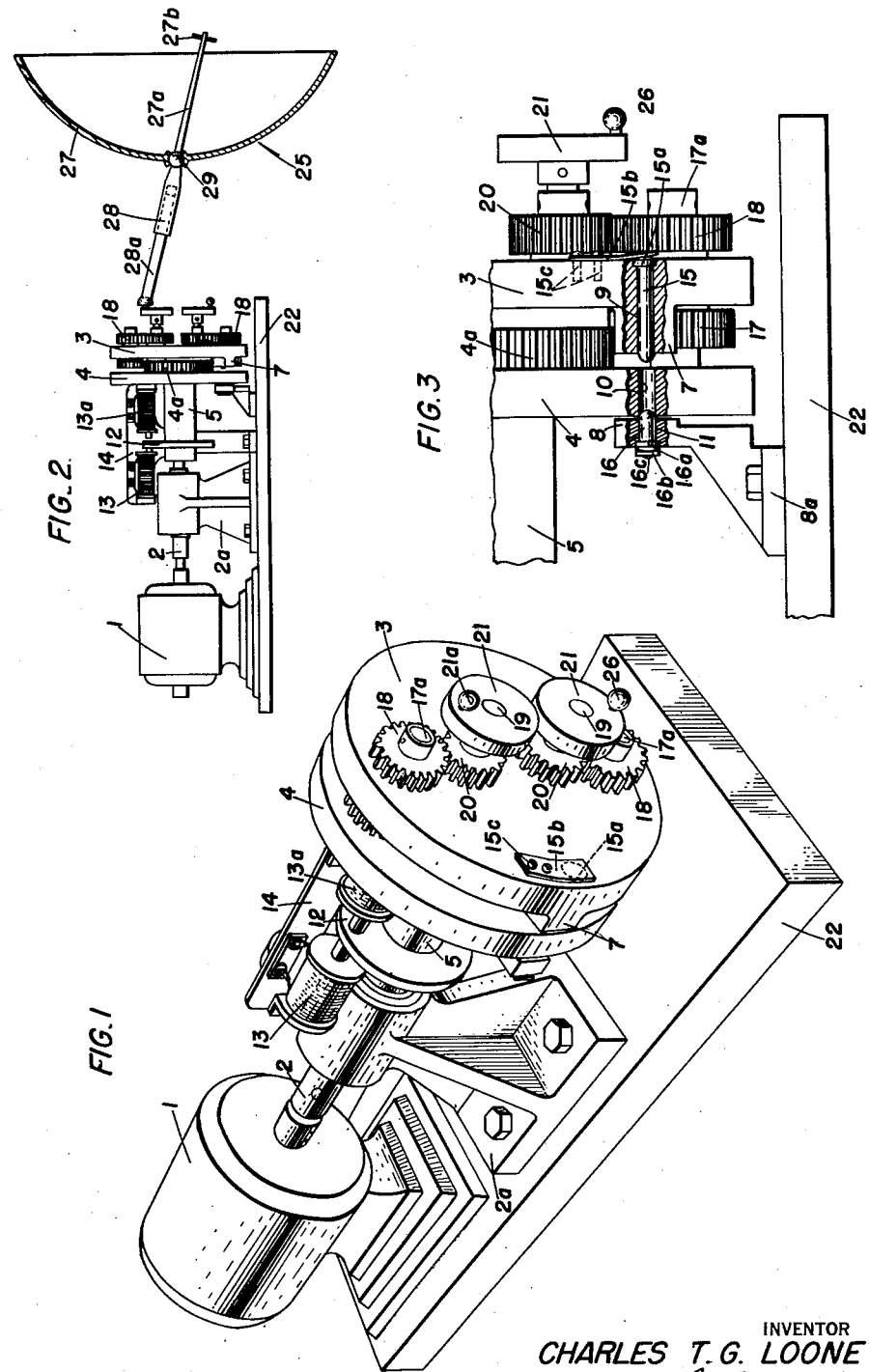
INVENTOR
CHARLES T. G. LOONEY
BY
ATTORNEY

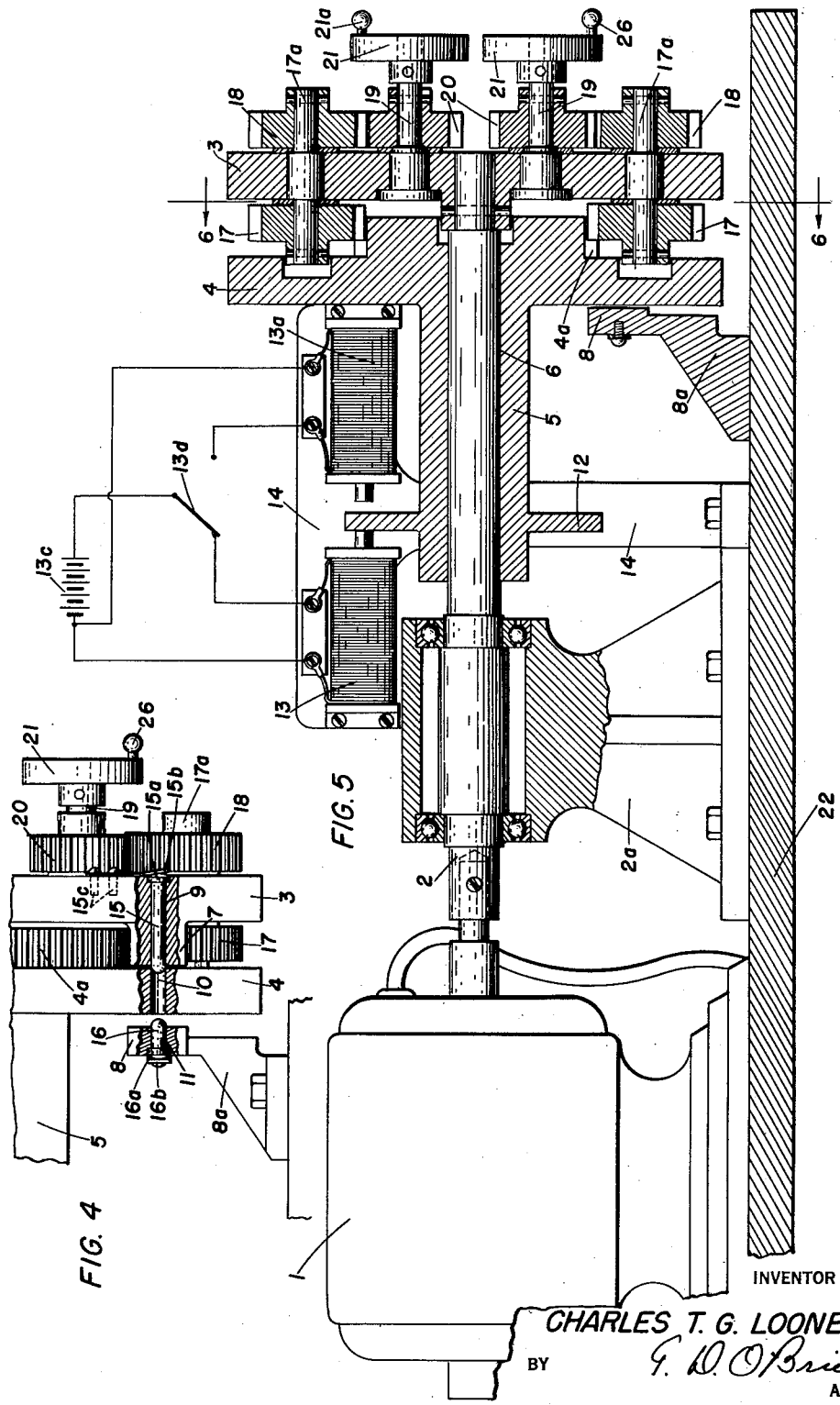

Patented Nov. 7, 1950

2,528,963

UNITED STATES PATENT OFFICE 2,528,963

DRIVE FOR NUTATORS

Charles T. G. Looney, Silver Spring, Md., assignor to the United States of America as represented by the Secretary of the Navy Application January 5, 1946, Serial No. 639,375

6 Claims. (Cl. 74—86)

The present invention relates to means for providing a nutating motion and, more particularly, to a novel mechanism for selectively producing circular or elliptic motion and which may be utilized to produce nutatory movements of either circular or elliptic type.

An object of the invention is to provide a mechanism for producing circular or elliptic nutating motion at will, which is characterized by its inclusion of a planetary type of gearing.

Another object is to provide a mechanism of the character described in which the change from one type of nutating motion to the other is effected by either locking part of the planetary gearing to another part of the gearing or releasing the first part and locking it to a stationary part of the mechanism.

A further object is to provide a mechanism of the character described in which the changes from one type of nutating motion to the other may be effected while the mechanism is operating.

An additional object of the present invention is to provide mechanism for selectively imparting nutatory motion of circular or elliptic type to a short wave antenna of the kind used in radar equipment.

These and other objects of the invention may be understood by reference to the accompanying drawings, in which Fig. 1 is a perspective view showing one form of the new mechanism;

Fig. 2 is a side view of the mechanism, showing it applied to a short wave antenna;

Fig. 3 is a fragmentary side view on an enlarged scale, partly in section, showing part of the means for shifting from one type of nutating motion to the other;

Fig. 4 is a similar view showing the shifting means in a different position;

Fig. 5 is a longitudinal section of the mechanism, partly in elevation;

Figure 7:
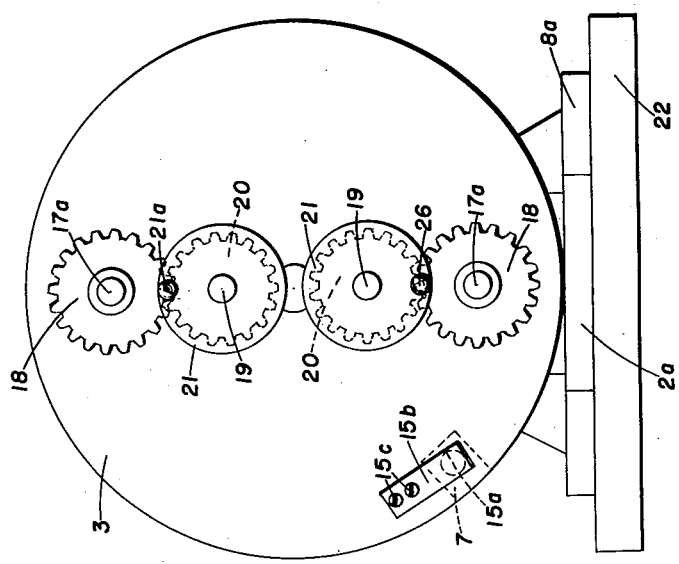
Fig. 7 is an end view of the mechanism, showing part of the planetary gearing.
Figure 6:
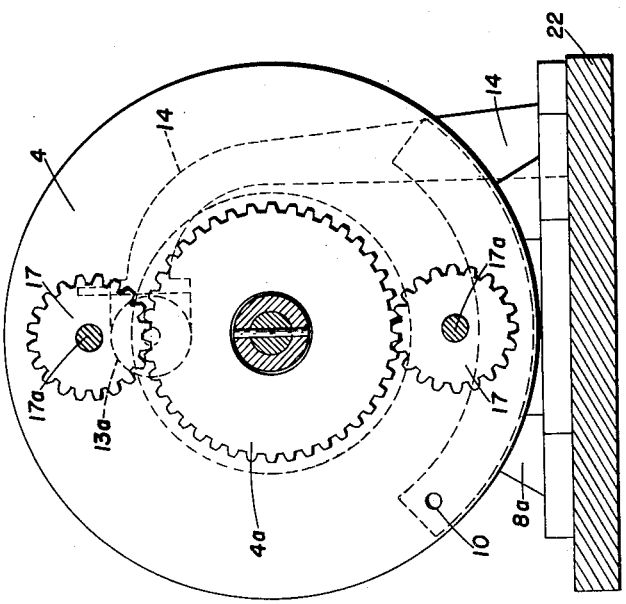
Fig. 6 is a sectional view on the plane indicated by line 6—6 in Fig. 5.

Referring to the drawings, the mechanism is shown as comprising a motor 1 having a shaft 2 journalled on a bracket 2a and carrying a disk 3 rigidly secured thereon so as to turn at the full speed of the shaft at all times. A second disc 4 has a hub either integral therewith or suitably secured thereto, the hub having a bore 6 (Fig. 5) large enough to fit slidably and rotatably on the shaft 2. The axial motion of the disc 4 need be only relatively small, so that at one extremity thereof the disc 4 will bear against lugs 7 on the disc 3, while at its other extremity the disc 4 will bear against stationary brake element 8 mounted on brackets 8a.

Alined holes 9, 10 and 11 are provided in the disc 3 and its lugs 7, the disc 4, and the brake element 8, so that a pin may be inserted through any adjacent pair of such holes to lock the disc 4 either to the rotatable disc 3 or the stationary brake element 8, when desired.

As will be described in detail presently, when disc 4 is thus locked to the rotating disc 3, a nutatory motion of circular type is provided, and when disc 4 is locked to the stationary brake element 8, an elliptic nutatory motion is provided. The insertion of the pin in either pair of adjacent holes 9, 10 and 11, to provide this selective locking, may be performed manually while the mechanism is stationary. Preferably, however, the mechanism includes means operable to change from circular to elliptic nutation and back again at will, without stopping the device completely to insert the pins manually in the holes 9—10 or 10—11. The change means comprises a suitable mechanical device to shift the disc 4 axially in one direction or the other, while in rotation such as customary in belt shifting devices or clutches, or an electrical device such as shown.

The electrical device here shown for shifting the disc 4 comprises an iron or steel disc 12 secured to the hub 5 to turn therewith, and two electromagnets 13 and 13a mounted on a stationary bracket 14 with the poles near and on opposite sides of the disc 12, so as to pull it in either direction, depending on which magnet is energized. The magnets 13 and 13a may be energized selectively from a battery 13c through a selector switch 13d.

The latch pins 15 and 16 used with this form of device are preferably of lengths slightly exceeding the lengths of the respective bores 9 and 11, in which they slide freely. These pins are located properly to enter the bore 10 of disc 4, the ends of the pins adjacent disc 4 being rounded to facilitate their entry into bore 10. Pin 15 has an enlarged head 15a and similarly pin 16 has an enlarged head 16a, said heads being normally seated in enlarged outer ends of the respective bores, as shown. The heads 15a, 16a, serve to prevent the pins from passing too far inward, and also receive the pressure from flat springs 15b and 16b, held by screws 15c and 16c to the disc 3 and the stationary member 8, respectively.

When the magnet 13 is energized, the disc 4 will tend to move to the left (Fig. 5), rubbing against the adjacent surface of the brake member 8, thus slowing the rotation until finally the rounded inner end of pin 16, which has been riding on disc 4, snaps into bore 10 and brings the disc to a full stop, at a definite position which is discussed later, by locking it to the brake 8. The spring 16b permits the pin to yield outwardly during the preliminary "slowing down" period, and ultimately snaps the pin into bore 10 (Fig. 3).

When it is desired to cause disc 4 to rotate, the magnet 13a is energized instead, and this will cause disc 4 to shift to the right, thus disengaging the pin 16 from the bore 10 and, on the other hand, causing the right side of disc 4 (Fig. 4) to bear against the lugs 7 of disc 3, pushing pin 15 to the right against spring 15b. The frictional engagement will cause disc 4 to pick up speed, the bore 10 meanwhile riding over pin 15 which will snap into said bore when the speed of disc 4 is high enough. The disc 4 will thus be locked to disc 3 in the proper way to provide circular nutation, as will be described later.

A sun gear 4a is secured to the disc 4 to rotate therewith. Gears 17 mesh with the sun gear 4a and are carried by shafts 17a journaled in the disc 3, but not connected in any way with the disc 4, so that rotation of the disc 3 may take place even when disc 4 is locked in a stationary position. In the latter condition, of course, the gears 17 will rotate their shafts 17a, as the teeth of gears 17 mesh with those of sun gear 4a, an example of the well known planetary type of gearing.

Each shaft 17a carries a gear 18 at its outer end. That is, the gears 17 and 18 will ordinarily be located on opposite sides of the disc 3, for convenience, although this is not an essential feature of the invention but merely simplifies the illustration thereof. Shafts 19 are journaled in the disc 3 for rotation with respect thereto and each shaft 19 carries a gear 20 rigid therewith, the gears 20 being in mesh with the respective gears 18 so that when the disc 3 rotates independently of disc 4, the gears 20 will rotate and will cause their shafts 19 to turn correspondingly. Each shaft 19 carries a disc 21 at its outer end, and rigid therewith, so that these discs 21 will turn at the same speed as the gears 20. One of the discs 21 carries an eccentrically disposed stud 21a for a purpose to be described presently.

The motor 1 and brackets 2a, 8a and 14 may be mounted on a base plate 22.

The operation of this device is as follows:

When the two discs 3 and 4 are locked together by the insertion of pin 15 through holes 9 and 10, obviously the gears 4a and 17 will move as a unit; that is, no relative motion of said gears is possible. Consequently the shafts 17a will merely act as though they were rigid with the disc 3 and will hold the gears 20 locked to disc 3. Thus, the discs 21 will merely turn as though rigidly secured to the disc 4, and the stud 21a will move in a circular path around the axis of the shaft 2.

The stud 21a may be used to drive the nutating device, and it may be remarked here that while two gear trains are shown, each comprising a set of gears 17, 18 and 20 and their connected shafts etc., only one such train is needed, the other being provided only to secure dynamic balance of the entire assemblage, which normally is in rapid rotation. For the same reason, a counterweight 26 may be provided on the other disc 21, to balance the stud 21a and the nutating mechanism 25 actuated thereby.

When the disc 4 is disconnected from the disc 3 and is held stationary by the pin 16 through holes 11 and 10, the gear 4a will remain at rest. However, as the disc 3 is rotated by the shaft 2, the shafts 17a will be carried around by disc 3 and cause the gears 17 to turn shafts 17a in their journals, since the gears 17 are meshed with gear 4a and must therefore rotate about their own axes as the disc 3 turns.

This rotation of the gears 17 and their shafts 17a will turn the gears 18 and thus the gears 20, while at the same time the disc 3 is turning about its own axis. The result is that both the stud 21a and the counterweight 26 will now move in non-circular paths, which in general will be hypocycloids. However, by selecting the number of teeth of the various gears in the train in such a way that the angular velocity of each disc 21, about its own axis, is twice that of the disc 3, the stud 21a and counterweight 26 will describe elliptic paths, the minor axis of said ellipse being equal to the minimum distance from center to center of stud 21a and counterweight 26 during rotation, while the major axis is the corresponding maximum distance. In the specific device illustrated, this would give a ratio of about 1 to 8 between the principal axes of the ellipse. The positions of these axes may be varied by proper choice of the angular position of the stationary element 8; that is, the major axis may be kept vertical, horizontal, or in any desired intermediate direction, by moving the element 8 about the axis of shaft 2 to a corresponding position.

One use to which the invention may be applied is shown in Fig. 2 where a reflector 27, such as is used in radar apparatus, is illustrated. An antenna support 27a for the dipole antenna 27b is located in front of the reflector near or in the focal plane thereof, and is mounted at one end of a bar 28. This bar passes through the middle of the reflector where it is mounted for pivotal motion in any direction, as by means of a spherical joint 29. At its rear end, the bar 28 has a sliding connection with a rod 28a, the rear end of which is bored to fit over the stud 21a with sufficient looseness to permit the disc 21 to rotate freely, so that the stud 21a may carry said end of the rod 28a along in its motion. It will be evident that a nutating motion of the lever 28 and antenna 27a will result.

The operation of the apparatus will be understood from the above description of its structural embodiment. Assuming that it is desired to cause the free end of antenna support 27a to travel in a circle, that is, to cause the antenna support to describe a cone, the discs 3 and 4 will be locked together, as by inserting pin 15 into hole 10, so that they must turn as a unit with the motor shaft 2. All of the gears are thus locked, as previously explained, and as a result the stud 21a and counterweight 26 will move in circular paths, thus imparting a conical motion to the lever 28 and the antenna support 27a carried thereby. The antenna 27b consequently, will describe a circle once for every revolution of the motor shaft 2.

Assume now that the discs 3 and 4 are freed from one another by removal of the pin 15, and the pin 16 is inserted instead into hole 10 so as to hold the disc 4 stationary while allowing disc 3 to continue to rotate at motor speed. The gears 16 will now travel around the stationary gear 4a, thus turning gears 17, shafts 17a, gears 18 and 20, shafts 19 and discs 21. As stated, the numbers of teeth on the various gears are such that the rotational speed of each shaft 19 is twice that of the motor.

Starting from the position of stud 21a shown in Fig. 1, when the disc 3 has made a quarter-turn, the stud will have made a half-turn about the axis of its shaft 19 and thus the stud will be at its minimum distance from the axis of shaft 2, and horizontally in the same plane therewith. The next quarter-turn of the disc 3 will bring the stud 21a to its lowermost position; that is, it will be where counterweight 26 is shown in Fig. 1. The next half-turn of disc 3 will, in a similar manner, return the stud 21a to its initial position by way of the opposite side of the axis of shaft 2. These positions will be repeated periodically together with all intermediate positions, the resulting path of stud 21a in this case being an ellipse with its major axis vertical. Of course, a similar motion will be produced in the antenna support 27a, the free end of which will thus travel in a similar ellipse with its major axis vertical, though not necessarily of the same length as that of the ellipse traveled by the stud 21a.

As previously mentioned, the described ellipse is about eight times as long as it is wide with the specific proportions disclosed, but other ratios may be obtained by varying the distance from center to center of the shafts 19 and/or the distance of the stud 21a from the axis of its shaft 19.

While in some cases it may be preferable to have the major axis of the ellipse, described by the antenna, in a vertical direction, attention is called to the fact that the direction of this axis may be shifted at will by changing the location of the stationary element 8 circumferentially of the disc 4. This member could also be replaced by a disc with a circularly arranged series of holes, any of which could be provided with a pin 16 for entering the hole 10 in disc 4, whereby the major axis of the described ellipse may be adjusted to different angles of inclination.

What is claimed is:

1. A mechanism of the character described, comprising a rotatable drive shaft, an element on the shaft rotatable therewith, a second element loosely mounted on the shaft adjacent said first element and having a sun gear, planetary gearing on said first element meshing with the sun gear and including a driven shaft offset from the axis of said drive shaft, a stud eccentrically mounted on said driven shaft, a stationary member adjacent said second element, latch pins carried respectively by the stationary member and by the first element, for selectively connecting the second element to the stationary member or to said first element whereby the stud will describe an elliptical path or a circular path, respectively, during rotation of the drive shaft, and means for shifting said second element to select the connection desired.

2. A mechanism of the character described, comprising a rotatable drive shaft, an element on the shaft rotatable therewith, a second element loosely mounted on the shaft adjacent said first element and having a sun gear, a driven shaft on the first element and offset from the axis of said drive shaft, a stud eccentrically mounted on said driven shaft, a stationary member adjacent said second element, separate latching means for connecting the second element at will, either to the stationary member or to said first element, means for shifting said second element selectively into engagement with the desired one of said latching means, and planetary gearing on said first element meshing with said sun gear and having a driving connection to said driven shaft for rotating the driven shaft twice for each revolution of the drive shaft when said second element is connected to the stationary member, whereby the stud describes a circular path when the second element is connected to the first element and an elliptical path when the second element is connected to the stationary member.

3. A mechanism of the character described comprising a rotatable drive shaft, an element on the shaft rotatable therewith, a stationary member adjacent the shaft, a second element loosely mounted on the shaft between said first element and the stationary member and having a sun gear, a device for coupling said second element to the first element, a device for coupling the second element to the stationary member, means for sliding the second member longitudinally on the drive shaft to operate said coupling devices alternately, planetary gearing on said first element meshing with the sun gear and including a driven shaft offset from the axis of the drive shaft, and a stud mounted eccentrically on said driven shaft, whereby the stud describes an elliptical path when said second element is coupled to the stationary member and a circular path when the second element is coupled to said first element, during rotation of the drive shaft.

4. A mechanism of the character described comprising a rotatable drive shaft, an element on the shaft rotatable therewith, a stationary member adjacent the shaft, a second element loosely mounted on the shaft between said first element and the stationary member and having a sun gear, a device for coupling said second element to the first element, a device for coupling the second element to the stationary member, electromagnetic means for sliding the second member longitudinally on the drive shaft to operate said coupling devices alternately, planetary gearing on said first element meshing with the sun gear and including a driven shaft offset from the axis of the drive shaft, and a stud mounted eccentrically on said driven shaft, whereby the stud describes an elliptical path when said second element is coupled to the stationary member and a circular path when the second element is coupled to said first element, during rotation of the drive shaft.

5. A mechanism of the character described comprising a rotatable drive shaft, an element on the shaft rotatable therewith, a stationary member adjacent the shaft, a second element loosely mounted on the shaft between said first element and the stationary member and having a sun gear, a device for coupling said second element to the stationary member in a predetermined position, a device for coupling the second element to said first element in a predetermined position relative thereto, means for sliding the second member longitudinally on the drive shaft to operate said coupling devices alternately, planetary gearing on said first element meshing with the sun gear and including a driven shaft offset from the axis of the drive shaft, and a stud mounted eccentrically on said driven shaft, whereby the stud describes an elliptical path when said second element is coupled to the stationary member and a circular path when the second element is coupled to said first element, during rotation of the drive shaft.

6. A mechanism of the character described comprising a rotatable drive shaft, an element on the shaft rotatable therewith, a second element loosely mounted on the shaft adjacent said first element and having a sun gear, a driven shaft on the first element and offset from the axis of said drive shaft, a stud eccentrically mounted on said driven shaft, a stationary member adjacent said second element, individual latching means for connecting the second element as desired, either to the stationary member or to said first element, during rotation of said drive shaft, means for moving said second element at will into engagement with the desired one of said latching means, and planetary gearing on said first element meshing with said sun gear and having a driving connection to said driven shaft for rotating the driven shaft twice for each revolution of the drive shaft when said second element is connected to the stationary member, whereby the stud describes a circular path when the second element is connected to the first element and an elliptical path when the second element is connected to the stationary member.

CHARLES T. G. LOONEY.

REFERENCES CITED

The following references are of record in the file of this patent:

UNITED STATES PATENTS

| Number | Name | Date |
|---|---|---|
| 361,222 | Jones et al. | Apr. 12, 1887 |
| 750,370 | Kammerer | Jan. 26, 1904 |
| 2,415,103 | Langstrath | Feb. 4, 1947 |

FOREIGN PATENTS

| Number | Country | Date |
|---|---|---|
| 129,805 | Austria | Oct. 10, 1932 |
| 322,659 | France | June 30, 1902 |